US009071599B2

(12) United States Patent
Charles et al.

(10) Patent No.: US 9,071,599 B2
(45) Date of Patent: Jun. 30, 2015

(54) METHOD AND DEVICE FOR SECURELY CONFIGURING A TERMINAL

(75) Inventors: Olivier Charles, Clamart (FR); Julien Tinnes, Paris (FR); Eric Leclercq, Brussels (BE)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 13/253,528

(22) Filed: Oct. 5, 2011

(65) Prior Publication Data

US 2012/0089838 A1 Apr. 12, 2012

Related U.S. Application Data

(63) Continuation of application No. 12/279,991, filed as application No. PCT/FR2007/050794 on Feb. 13, 2007, now abandoned.

(30) Foreign Application Priority Data

Feb. 21, 2006 (FR) ...................... 06 01536

(51) Int. Cl.
*H04L 9/32* (2006.01)
*H04L 29/06* (2006.01)
*G06F 9/44* (2006.01)

(52) U.S. Cl.
CPC .......... *H04L 63/0853* (2013.01); *G06F 9/4401* (2013.01)

(58) Field of Classification Search
CPC . G06F 21/72; G06F 21/10; G06F 2221/2107; H04L 9/08; H04L 63/0428
See application file for complete search history.

(56) References Cited

U.S. PATENT DOCUMENTS

| 5,249,218 | A | * | 9/1993 | Sainton | 455/418 |
| 5,367,563 | A | * | 11/1994 | Sainton | 379/93.29 |
| 5,448,045 | A | * | 9/1995 | Clark | 235/382 |
| 5,892,902 | A | * | 4/1999 | Clark | 726/5 |
| 6,487,196 | B1 | * | 11/2002 | Verthein et al. | 370/352 |
| 6,845,908 | B2 | * | 1/2005 | Morita et al. | 235/382 |

(Continued)

FOREIGN PATENT DOCUMENTS

| WO | 2005-036822 | 4/2005 |
| WO | 2005036822 A1 | 4/2005 |

(Continued)

OTHER PUBLICATIONS

International Search Report dated Aug. 16, 2007 for corresponding International Application No. PCT/FR2007/050794, filed Feb. 13, 2007.

(Continued)

*Primary Examiner* — Jeffery Williams
*Assistant Examiner* — Sanchit Sarker
(74) *Attorney, Agent, or Firm* — David D. Brush; Westman, Champlin & Koehler, P.A.

(57) ABSTRACT

A method of configuring a terminal including initializing the terminal, and which automatically triggers at least: detecting presence of a memory by a basic input/output system of the terminal, accessing the memory by the basic input/output system, starting up an operating system stored in the memory, and starting up a driver of a telecommunication network access module, the driver of the access module being stored in the memory and configured to drive the access module through a communication link between the terminal and a telecommunication device including the access module.

12 Claims, 2 Drawing Sheets

(56) References Cited

U.S. PATENT DOCUMENTS

| | | | |
|---|---|---|---|
| 7,155,615 B1 * | 12/2006 | Silvester | 713/185 |
| 7,281,068 B2 * | 10/2007 | Davis et al. | 710/62 |
| 7,424,615 B1 * | 9/2008 | Jalbert et al. | 713/171 |
| 7,738,920 B1 * | 6/2010 | Werner et al. | 455/557 |
| 2004/0139252 A1 * | 7/2004 | Sinpraseuth et al. | 710/62 |
| 2005/0066067 A1 * | 3/2005 | Suh | 710/1 |
| 2005/0125513 A1 * | 6/2005 | Sin-Ling Lam et al. | 709/220 |
| 2005/0138414 A1 * | 6/2005 | Zimmer et al. | 713/201 |
| 2006/0015931 A1 | 1/2006 | Davis et al. | |
| 2006/0026338 A1 * | 2/2006 | Ebara et al. | 711/103 |
| 2006/0107062 A1 * | 5/2006 | Fauthoux | 713/182 |
| 2007/0082704 A1 | 4/2007 | Nakano et al. | |
| 2007/0168652 A1 * | 7/2007 | Mylly et al. | 713/2 |
| 2008/0137622 A1 * | 6/2008 | Russell | 370/338 |
| 2008/0212663 A1 * | 9/2008 | Lochner | 375/225 |
| 2008/0259881 A1 * | 10/2008 | Hancock et al. | 370/338 |
| 2009/0132816 A1 * | 5/2009 | Lee | 713/164 |
| 2010/0197269 A1 * | 8/2010 | Nam et al. | 455/410 |
| 2012/0089838 A1 * | 4/2012 | Charles et al. | 713/171 |

FOREIGN PATENT DOCUMENTS

| | | |
|---|---|---|
| WO | 2005-043468 | 5/2005 |
| WO | 2005043468 A2 | 5/2005 |

OTHER PUBLICATIONS

International Preliminary Report on Patentability and English translation of the Written Opinion dated Oct. 21, 2008 for corresponding International Application No. PCT/FR2007/050794, filed Feb. 13, 2007.

* cited by examiner

METHOD AND DEVICE FOR SECURELY CONFIGURING A TERMINAL

This application is a continuation of U.S. Ser. No. 12/279,991 filed Aug. 20, 2008, which is National Stage of PCT/FR07/50794, filed Feb. 13, 2007, the entire content of which is incorporated herein by reference, and claims priority under 35 U.S.C. 119 to French Application No. 06 01536 filed Feb. 21, 2006.

The invention relates to the field of telecommunications and computing; it relates more precisely to a method and device for configuring a terminal.

The invention finds relevant applications in all travel situations, that is to say situations in which users of a computer terminal make remote use of the resources of a computer system or of a computer network. Customarily, travelling users use their own portable personal computer and connect it to the network of their company via the Internet network or the network of a telecommunication operator.

Computer security is a problem during these remote connections, on account in particular of the presence of risks such as viruses on the PC, eavesdropping on the communication, intrusion on the company's network. It is therefore obligatory that the software used be reliable, and therefore free of viruses, spyware, Trojan horses, etc, and that the connection between the computer and the company's network be made secure, for example by using a virtual private network. This is the reason why companies require that the connection be established from a terminal that they have provided the employee with and proscribe connections from machines whose content is not controlled. A consequence of this situation is that travelling users must routinely carry their portable computer around with them and do not have the possibility of using another personal computer, that of the house or of a friend for example.

It is therefore important to have a technical solution for configuring and connecting a personal computer to a company network which guarantees that the software which will subsequently be used is fully reliable, whatever personal computer or terminal is used to implement the connection.

The most successful technical solutions in this field are the recording media of CD-ROM type comprising an operating system which will be booted when the computer is started up. The big defect of this system is not providing any means for storing the user's data.

The appearance of removable memories that can be connected to the USB (Universal Serial Bus) port of a personal computer and in which a complete operating system is stored in a format such that, when the computer is restarted, it is this operating system which will be run, is also beginning to be seen. Consequently only the software embedded in the removable memory will be invoked, and not the software initially installed on the hard disk of the computer. In this way, the security level offered depends solely on the software in the memory and not on the personal computer used.

However it is not simple for a user to configure the operating system of the personal computer so as to have access to the network. It is already necessary that he has the driver to operate the peripheral for accessing the network of the personal computer and that he knows how to configure the network access software with the connection parameters. It is not therefore possible to automate this phase since all these elements depend physically on the machine to be configured and on the manner in which it is connected to the network.

The aim of the invention is to provide a device and a method for automatically configuring a terminal, with a view to accessing a predefined telecommunication network, on the basis of data of a computer environment that are stored in a memory.

With this aim, the subject of the invention is, according to a first aspect, a method of configuring a terminal comprising a step of initializing said terminal and which automatically triggers at least:
- a step of detecting presence of a memory by a basic input/output system of the terminal,
- a step of accessing said memory by the basic input/output system, and
- a step of starting up an operating system of said terminal, stored in said memory,
- a step of starting up a driver of a telecommunication network access module, the driver of the access module being stored in said memory and able to drive the access module from said terminal through a communication link between said terminal and a telecommunication device comprising said access module.

By virtue of this method, the terminal is automatically configured to use a telecommunication network access module, this module being that of a telecommunication device, for example a mobile telephone. This module is independent of the terminal used. It is preferably specific to a given user. Furthermore, its characteristics being known, it is possible to configure the terminal to access the telecommunication network on condition that the driver appropriate to this device is available. Preferably, the communication link between the terminal and the device will be established by USB link or by nonwired link.

According to an embodiment, the method furthermore comprises:
- a step of establishing a communication link between said terminal and said communication network, by means of said access module and of connection parameters stored in said memory.

In this way, the terminal can readily be configured to access a telecommunication network with connection parameters which are specific to the user. The connection program is preconfigured to operate with the driver provided and the network access module.

According to an embodiment, the method furthermore comprises:
- a step of starting up a driver of a chip card reading device able to interrogate a chip card, the driver being stored in said memory and being able to drive the reading device through a communication link between said terminal and the reading device.

The presence of a chip card reading device makes it possible to afford robust functions for encipherment at the terminal level.

According to an embodiment, the method furthermore comprises:
- a step of establishing a secure communication tunnel between said terminal and a server of said telecommunication network, during which step a strong authentication procedure is implemented by means of a chip card interrogatable via said driver of the chip card reading device.

A reliable and secure connection can thus be implemented when connecting the terminal to the communication network, the authentication procedure being able to succeed only if a PIN code (personal identification number) is provided to the chip card.

According to an embodiment, the method furthermore comprises:

a step of constructing at least one virtual partition on the basis of enciphered data stored in said memory with a view to rendering said enciphered data accessible by a user of said terminal.

A user's data can thus be stored in a secure manner in the memory and nevertheless be rendered readily accessible by a user of the terminal.

According to an embodiment, the method furthermore comprises:

a step of dispatching to a chip card, interrogatable via the driver of the chip card reading device, a request to decipher at least one enciphered deciphering key, a step of deciphering at least part of the enciphered data stored in said memory by means of at least one deciphered deciphering key.

Thus access to the user's data is made secure on account of the intervention of the chip card in the data access process. Specifically, the decipherment of the enciphered key or of the enciphered keys by the chip card is performed only conditionally on providing the chip card with a PIN code.

Correlatively, the subject of the invention is a device for configuring a terminal, the device comprising at least, a memory, a telecommunication device comprising a telecommunication network access module, said memory being accessible by a basic input/output system of said terminal during a phase of starting up of said terminal, said memory comprising, an operating system of the terminal, a driver of the access module able to drive said access module from said terminal through a communication link between said terminal and said telecommunication device, the starting up of the terminal automatically triggering at least, the detection by the basic input/output system of the terminal of the presence of said memory, access by the basic input/output system to said memory, and the starting up of the operating system stored in said memory, the starting up of the driver of the access module.

According to an embodiment, the device according to the invention furthermore comprises a chip card, a reading device able to read and/or interrogate the chip card, said memory furthermore comprising, a driver of the reading device able to drive the reading device from said terminal through a communication link between said terminal and the reading device, the operating system being able to start up the driver of the reading device.

According to an embodiment, the device furthermore comprises means for storing data comprising, enciphered data, at least one enciphered deciphering key, said memory furthermore comprising, a data access management driver able to construct at least one virtual partition on the basis of enciphered data stored in said means for storing data, so as to render said enciphered data accessible by a user of said terminal, the data access management driver being able to dispatch to the chip card via the driver of the reading device a request to decipher at least one enciphered deciphering key and able to trigger the decipherment of at least part of the enciphered data by means of at least one deciphered deciphering key, wherein the operating system being able to trigger the execution of the deciphering driver.

The advantages stated for the method according to the invention are transposable to the device according to the invention and to its various embodiments.

According to an embodiment, said memory, said access module and said chip card are integrated into a mobile telecommunication terminal.

In this embodiment, the device making it possible to configure the terminal is readily portable. Furthermore, it is reliable and allows a user to easily transport his personal data.

Other aims, characteristics and advantages of the invention will become apparent through the description which follows, given solely by way of nonlimiting example, and with reference to the appended drawings in which:

FIG. 1a illustrates a first embodiment of the device according to the invention.

Figure 1A:
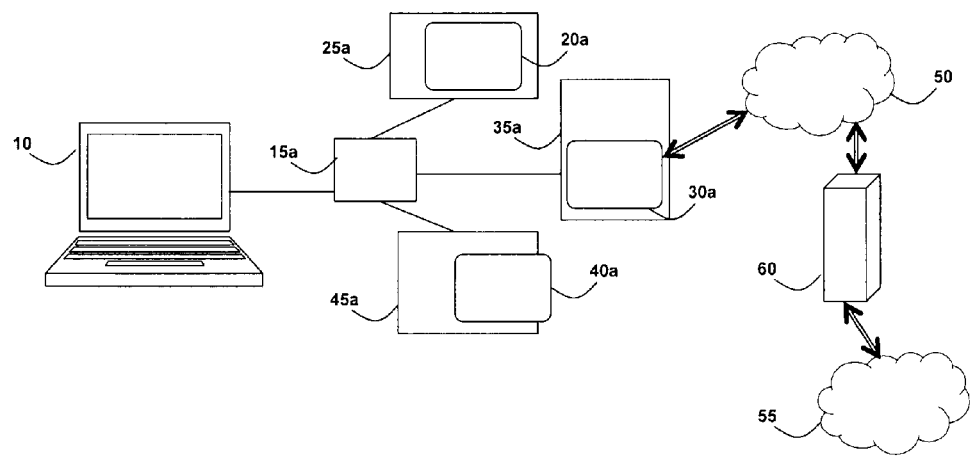
FIG. 1a is an illustration of a first embodiment of the device according to the invention.

The device represented in FIG. 1a comprises:

a terminal 10;

a multiport repeater 15a (more commonly called a "hub");

a data recording medium 25a comprising a memory 20a;

a chip card reading device 45a, making it possible to read, to access or to interrogate a chip card 40a;

a telecommunication device 35a comprising a network access module 30a for accessing a telecommunication network 50.

The telecommunication network 50 is for example an Ethernet network, a GSM/GPRS cellular network, a UMTS cellular network, a WIFI network, the switched telephone network (STN), etc.

The invention is aimed at providing a device and a method for automatically configuring the terminal 10, in order to access the telecommunication network 50, and in particular in order to access a predefined server or gateway 60. This server 60 is for example a gateway controlling access to a second telecommunication network, this second telecommunication network being for example a company network (Intranet). The invention allows a travelling user to access a predefined telecommunication network 50 by using the terminal 10, even if this terminal 10 does not have means for accessing the telecommunication network 50.

The terminal 10 is typically a personal computer, having at least a central data processing unit, a keyboard, a screen, and a communication bus for interconnecting peripherals to the central unit, for example a series bus meeting the USB (Universal Serial Bus) standard. It is not essential for the terminal to have a hard disk, insofar as the latter is not used for the implementation of the invention. The terminal 10 furthermore comprises at least one USB port for linking up an external peripheral.

The terminal 10 furthermore comprises a memory in which the BIOS (Basic Input/Output System) is stored, a low level program allowing the detection, while the terminal 10 is starting up, of the peripherals connected to the terminal 10, as well as the starting up of the operating system.

The recording medium 25a is embodied for example in the form of a USB key, a CD-ROM, a removable hard disk, etc. This recording medium is preferably a medium that can be readily carried around by a travelling user.

The telecommunication device 35a is for example a mobile telecommunication terminal, the network access module in this case advantageously consisting of the telecommunication network access modem. The telecommunication terminal is for example a mobile telephone or a personal assistant (PDA, Personal Data Assistant).

The network access module 30a allows access to the telecommunication network 50 considered and is therefore compatible with the communication standards of this network.

In the exemplary embodiment described, the three peripherals 25a, 35a, 45a are peripherals having a serial port in accordance with the USB standard and can be linked up by a USB bus cable to a USB port of the terminal 10.

The repeater 15a makes it possible to link up the three peripherals 25a, 35a, 45a on one and the same USB port of the terminal 10. Its role is in particular to multiplex the data arising from the various peripherals for access to the USB bus. The presence of such a repeater is however not necessary if the terminal 10 has sufficient USB ports. In this case, the three peripherals can be linked up directly to the terminal 10, that is to say without the intermediary of the repeater.

As a variant, other types of communication bus or other types of communication link can be used to effect the communication link between the terminal 10 and the three peripherals. However, as regards the recording medium, this medium must be detected and recognized by the BIOS of the terminal 10 as a data storage peripheral liable to comprise the execution data of an operating system of the terminal 10.

Figure 1B:
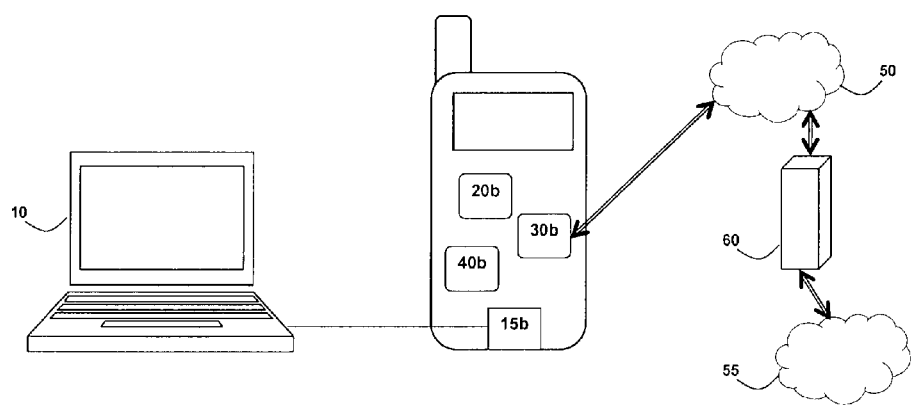
FIG. 1b is an illustration of a second embodiment of the device according to the invention.

FIG. 1b illustrates a second embodiment of the invention. In this second embodiment, the repeater 15b, the memory 20b, the access module 30b, the chip card 40b form part of one and the same mobile telecommunication terminal 35b. This terminal 35b comprises chip card reading means and in this sense constitutes a chip card reading device able to read and/or interrogate a chip card. It also has a USB port making it possible to establish a communication link with the terminal 10. This terminal is embodied for example in the form of a mobile telephone or personal assistant (PDA, Personal Data Assistant).

This second embodiment has the advantage of being very compact and easy for a travelling user to carry around.

By hooking up the mobile telephone to the terminal 10 by way of a USB cable, three peripherals are then accessible by the terminal 10 via the same USB port:
   a memory or memory area, seen as a conventional USB key,
   a network access module, which is in fact the mobile telephone's network access modem,
   a chip card, which is in fact the SIM (Subscriber Identity Module) card of the network access module.

In this second embodiment, the telephone is seen by the terminal 10 either as a network card, or as a modem.

The subsequent description refers equally to the first embodiment and to the second embodiment.

For the implementation of the invention, the following data are stored in the memory 20a, 20b:
   a starting sector with a program for starting an operating system of the terminal 10;
   execution data of this operating system;
   execution data of application packages, compatible with this operating system;
   one or more partitions with enciphered data (programs, files, parameters, etc.) of a user of the terminal 10;
   one or more keys for deciphering, respectively enciphering, the user's data.

With a view to encipherment, respectively decipherment, each decipherment, respectively encipherment, key is associated with a partition or with a data block of a partition. In a simplified embodiment, it is the entire partition which is enciphered. Subsequently in the description, the enciphering keys are denoted $KC_i$, and the deciphering keys $KD_i$ with $0 \leq i < N$, where N is the number of encipherment, respectively decipherment, keys. In the case where a symmetric encipherment procedure is used, the keys $KC_i$ and $KD_i$ are identical.

The enciphering and deciphering keys $KC_i$ and $KD_i$ are enciphered before being stored in the memory 20a, 20b. The enciphered keys are denoted $KCC_i$ and $KCD_i$ respectively.

The execution data of the operating system themselves comprise:
   at least one file comprising the program of the operating system itself (image of the operating system, also called the kernel);
   peripheral drivers, including a driver of the reader of the chip card 40a, 40b, a driver of the access module 30a, 30b as well as a data access management driver, managing access to enciphered data of the memory 20a, 20b and implementing encipherment and decipherment functions;
   the execution parameters of the operating system as well as the parameters associated with the drivers.

The execution data of application packages themselves comprise:
   application packages, including a program for connecting to a telecommunication network accessible via the access module 30a, 30b;
   execution parameters of these application packages, in particular connection parameters to be used during the establishment of a connection to the network by the connection program.

The data access management driver is designed to dispatch to the chip card via the driver of the reading device a request to decipher one or more deciphering keys $KCD_i$ and to decipher all or some of the enciphered blocks by means of the deciphered deciphering keys $KD_i$.

The connection parameters are dependent on the telecommunication network used. These parameters comprise for example:
   for a connection to a GPRS (General Packet Radio Service) network: APN (Access Point Name), type of authentication protocol, an IP (Internet Protocol) address, etc.
   for a connection to a WiFi network: name of the SSID (service set identifier) (e.g.: Orange); mode of authentication, mode of encipherment, enciphering key, etc.
   for a connection to a telephone network via an ADSL modem: point-to-point protocol used (PPPoA or PPPoE), Internet access provider's client name and password, etc.

The chip card has encipherment and decipherment functions. It furthermore contains a first digital certificate for authentication during implementation of a secure link and a second digital certificate for data encipherment.

As regards data encipherment, use is made for example of asymmetric cryptography functions. In this case, the chip card contains a digital certificate, a public key $K_{pub}$, used for data encipherment, and a private key $K_{pri}$ used to decipher what has been enciphered by means of the public key. The public key $K_{pub}$ can be transmitted to a program executing outside of the chip card with a view to encipherment, while the use of the private key $K_{pri}$ is reserved for the secure environment of the chip card and for the decipherment programs implemented in the chip card.

The keys $KC_i$ and $KD_i$ for enciphering and deciphering the data of the partitions of the user are themselves enciphered by means of the public key $K_{pub}$ of the digital encipherment certificate before being stored in the memory 20a, 20b. The chip card is used in the context of the invention to decipher the enciphered keys $KCC_i$ and $KCD_i$ by means of the private key $K_{pri}$ of the digital encipherment certificate.

A rule defines which enciphering key, respectively deciphering key, must be used for a data partition or block. For example, if N enciphering keys (and therefore N deciphering keys) are used, and if there are Z memory blocks to be enciphered, the rule defines that a block x, 0≤x<Z, will be enciphered, respectively deciphered, by means of the enciphering key $KC_i$, respectively deciphering key $KD_i$, such that x is congruent to i modulo N.

Figure 2:
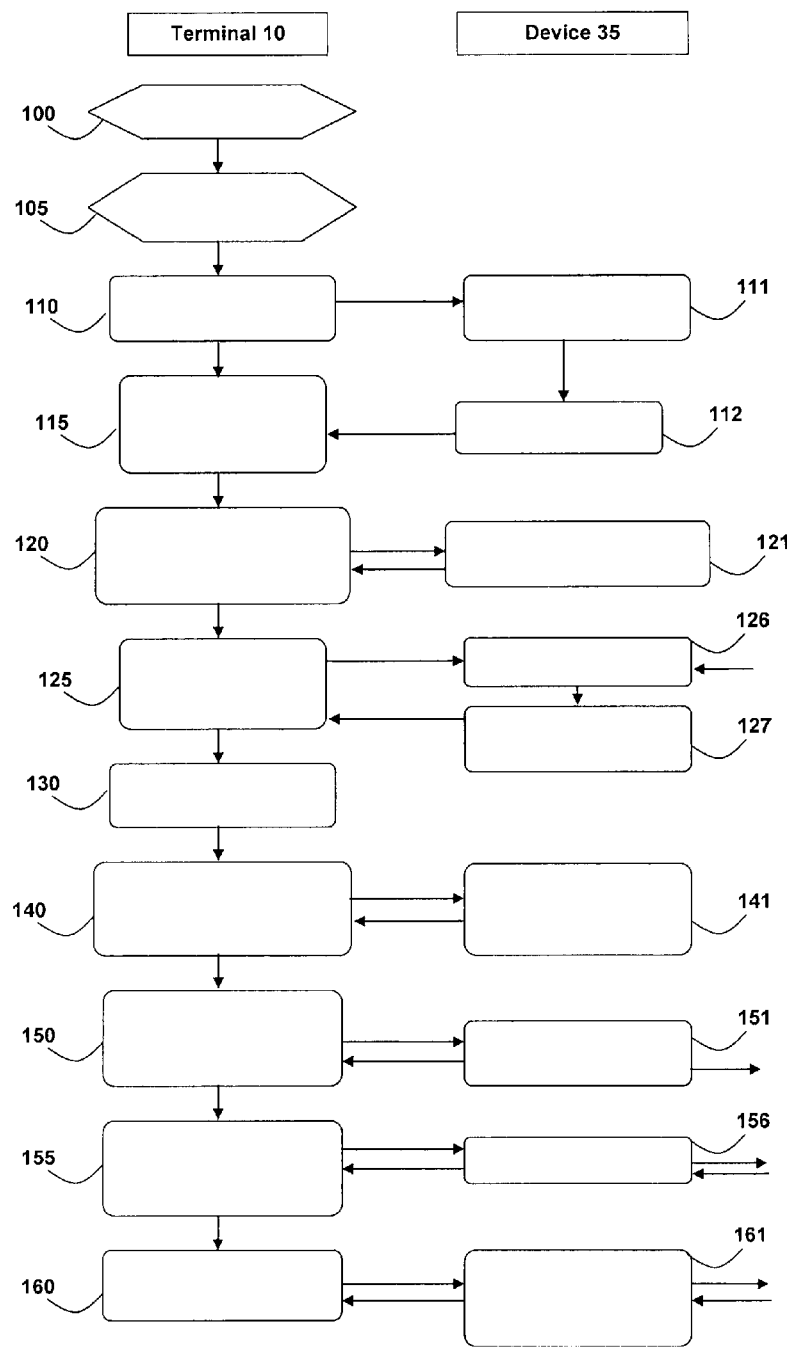
FIG. 2 represents a flowchart of an embodiment of the method according to the invention.

The method according to the invention is now described in greater detail by reference to FIG. 2.

In step 100, the connection is effected between on the one hand the terminal 10 and on the other hand a device, designated under the general reference 35. The device 35 comprises in the embodiment of FIG. 1a, the peripherals 25a, 35a, 45a, and, in the embodiment of FIG. 1b, the device 35b.

In step 105, the terminal is powered up and started.

In step 110 the BIOS program of the terminal is started. This BIOS program executes a procedure for detecting the peripherals present on the terminal or interconnected to this terminal. It searches, according to a predefined order in a configurable list which is specific to it, among the data recording media, for the first medium comprising a booting sector comprising data for booting the operating system. Traditionally, the standard configuration of the startup lists indicates that the apparatuses connected to the USB bus must be interrogated before the hard disk of the terminal. Consequently, in the invention, it is the USB key memory boot sector which is used.

In step 111, the memory responds to the presence detection. The program of the BIOS therefore detects the presence of a storage memory 20a, 20b on the USB peripheral 25a or 35b. In step 112, the program of the BIOS read-accesses the memory.

In step 115, the BIOS program triggers the execution of the startup program found in the memory. This startup program actually triggers the execution of the operating system stored in the memory 20a, 20b.

In step 120, the operating system detects the presence of a chip card reader and runs the driver corresponding to this chip card reader, which driver is also stored in the memory 20a, 20b. In step 121, the chip card reader is started following the running of its driver.

In step 125, the operating system runs the data access management driver, which driver is also stored in the memory 20a, 20b. This driver dispatches a request to the driver of the reader of the chip card to ask the chip card to decipher deciphering keys $KCD_i$. In step 126, the reader of the chip card asks the user to enter his identification code. In the event of erroneous entry, after three erroneous attempts, access to the chip card is denied and the method is interrupted. In the converse case, the chip card is unlatched and deciphers the deciphering key or keys $KCD_i$, then returns deciphered keys $KD_i$ to the data access management driver.

In step 130 the data access management driver sets up, that is to say constructs, on the basis of a part (a partition, a file, a block) of the memory 20a, 20b (physical mass medium) comprising the user's enciphered data, a virtual partition so that the enciphered data stored in this part is rendered accessible by a user of the terminal. The part of the memory is thus rendered accessible to the user via a virtual storage peripheral containing an encrypted system of files. The logical organization of the files stored in the part of the memory is seen by the user as a tree of directories and files, which tree is identical or similar to those customarily used for a hard disk partition, the data access management driver constructing this tree so as to render the data stored in the relevant part of the memory 20a, 20b accessible by a user of the terminal.

Following a request for read-access (respectively write-access) to a data file of this tree, the data access management driver deciphers (respectively enciphers) on the fly the data block or blocks comprising this file by using the deciphered keys $KD_i$, the whole of the data to be deciphered being projected into memory by the so-called mapping technique before decipherment and preserved in projection memory in deciphered form, so as to be able to be used or modified by the user of the terminal. In this way a virtual or logical mass medium, the image of a part of the physical mass medium, is rendered accessible by the user by virtue of the data access management driver.

Advantageously, no memory swapping process will be used. The absence of swapping guarantees that the deciphered file will never be present on any disk, or even on another medium, thereby enhancing the security of the device.

In this way, the user of the terminal has on the basis of the USB memory a conventional system of files, the driver being in charge of enciphering and deciphering the blocks of the USB memory during use.

In step 140, the operating system detects the presence of a network access module 30a, 30b and runs the driver corresponding to this network access module, which driver is also stored in the memory 20a, 20b. In step 141 the network access module 30a, 30b is started up.

In step 150, the operating system triggers the execution of the program for connecting to the telecommunication network 50 stored in the memory 20a, 20b. This program dispatches commands to the network access module in order to establish the connection. Preferably, this connection program is preconfigured with connection parameters specific to the user, which are stored in the memory 20a, 20b. In this way, the user does not need to perform any manual configuration in order to establish this connection.

As an alternative, it is the user who manually triggers the execution of the network connection program.

In step 151, following the triggering of this program, the connection to the network is established by the module 30a, 30b for accessing the network 50. At this juncture, the user can access services on the network (Web, messaging, etc.).

In step 155, the network connection program triggers a procedure for setting up a secure link or secure tunnel between the terminal 10 and the server 60 interconnected to the network 50.

The procedure for establishing the secure link is either triggered automatically by the connection program or at the request of the user of the terminal 10.

In step 156, following step 55 and following an authentication request received from the server 60 by the terminal 10 during the procedure for establishing the secure link, the chip card reader or the device 35b asks the user to enter his identification code, so as to unlatch access to the strong authentication certificate stored in the chip card in order to carry out a strong authentication operation. Optionally, this identification code can be different from the code used in step 126.

In step 160, in the event of successful authentication, the procedure for establishing the secure link continues. The establishment of the secure link calls upon customary techniques for establishing virtual private networks, implementing in particular a secure protocol (IKE and IPSec for example). In step 161, following the establishment of the connection, the user is able to access the server 60. In the case where this server serves as access gateway to a company network, the user will be able to access this company network.

Optionally, the user can update his software environment by downloading, from this server or another server, correctives or new programs and insert them onto his memory module.

To restore the initial configuration of the terminal 10, it suffices for the user to stop the terminal 10 and disconnect the peripherals 25a, 35a, 45a (embodiment of FIG. 1a) or the device 35b (embodiment of FIG. 1b): when the terminal 10 is next started up, the latter will be in its initial configuration again.

By virtue of the software embedded in the memory module, it is possible, without manual configuration of the user, to access enciphered data stored on a data storage medium, to operate a network access module and to access the network 50 from the terminal 10, doing so whatever the host terminal 10 to which the device 35b or the peripherals 25a, 35a, 45a are hooked up.

From a technical point of view, the device exhibits a very high security level on account of the coupled use of a memory, a network access card and a chip card.

Using a chip card makes it possible to use, during encipherment, much longer keys than a simple password and therefore improves the security level of the device. Furthermore, the chip card much improves the ergonomics of the device by limiting user entry to a short identification code (in general 4 digits), before authorizing access to the private data of the card. Finally, a chip card shuts down after three fruitless attempts at code entry, thereby making it possible to prevent attacks by exhaustive attempts.

Access to the enciphered data and the setting up of a secure communication tunnel are conditioned by the provision of a personal identification code (PIN).

The hard disk of the terminal 10 is never invoked. Furthermore the user does not leave any personal data there. Moreover, the user cannot execute the programs that are resident on the hard disk of the machine, in particular viruses or malicious programs. Generally, only the programs that are present in the memory will be able to be executed.

If the procedure for remotely updating the software in the memory module is intact, the complete software remains intact over time. There is no risk of deterioration of the security level. Preferably, the update management program comprises a downloaded software signature verification function to prevent the downloading of uncertified programs.

By virtue of the invention, the connection program is preconfigured to operate with a predefined network access module and in the context predefined by the telecommunication operator providing access to the network, and in particular with connection parameters specific to a user.

When the operating system is started up, that is to say when the terminal 10 is started up, the operating system uses the resources of the network access module to allow access to the network by the user's programs.

The connections pass through a network controlled by the user himself (company network or domestic network) or by his operator (mobile or WiFi network).

As a supplement, it is technically easy, for example by not providing the drivers for managing these interfaces, to contrive matters such that the operating system started up from the memory module cannot use network interfaces other than that of the device. This avoids connection to non-secure networks.

As regards access to the modem of the device 35a, 35b or access to the chip card of the device 35b, a wireless link can be used as an alternative to a USB bus-based wired link between the terminal and the device 35a, 35b, for example a WiFi or Bluetooth link.

As regards the use of the SIM card of the network access module as card (embodiment of FIG. 1b), a virtual driver such as that described in the patent document published under the number WO2005/036822 is preferably used for the terminal 10. Such a driver may be used equally well with a wired or nonwired link between the terminal and the device 35a, 35b. In this way, the terminal will be able to access the SIM card as if dealing with a chip card inserted into a local chip card reader, and therefore disregarding the USB link and access constraints related to the integration of the SIM card into the environment of the mobile terminal.

A virtual driver is also usable for driving the network access module, in such a way that the network access programs operate in the same manner as if the network access module was a module installed locally in the terminal 10.

As an alternative to the use of a USB key, in particular in the case of a relatively old personal computer 10 which cannot start up on the USB port, it is possible to use a CD-ROM for the first phase of configuring and starting up the operating system, then, once the operating system has been started and the USB peripherals are accessible, to search for the user data on the USB-based storage area or on a storage area accessible via another type of communication link, for example a memory area of the mobile terminal 35b which would be accessible via a Bluetooth link established between the terminal 10 and the mobile terminal 35b.

Generally, to increase the storage capacity, two recording media can be used: one for installing the operating system and drivers, the other for the user's data. In this case, the first of the two media is accessible by the BIOS and detected as forming part of the list of media that the BIOS analyzes to detect therein the presence of a startup program. The second of the two media is accessible from the terminal 10 by means of a storage peripheral management driver via a communication link between the terminal 10 and this recording medium.

In an embodiment where data storage volume will be favored over speed of execution, it will be possible to replace the USB memory by a mini hard disk.

The process for configuring the terminal 10 according to the invention is entirely automated. The only moments at which the user intervenes are when entering personal identification codes, or optionally, for running the connection program or the program for establishing the secure link. By virtue of the invention, it therefore becomes extremely simple for a travelling user to configure any personal computer in order to access a network, or more simply, so as to work in a predefined software environment and with his own specific data. The integrity of the software environment and of the user's data is guaranteed.

The invention claimed is:

1. A method of configuring a terminal comprising:
    initializing the terminal, which automatically triggers at least:
        detecting presence of a memory by a basic input/output system of the terminal, wherein the memory is distinct from any memory of the terminal and comprises an operating system of the terminal and a network access driver of a telecommunication device, which are stored thereon;
        accessing the memory by the basic input/output system;
        starting up the operating system of the terminal that is stored in the memory;
        detecting, by the operating system of the terminal, presence of a telecommunication network access modem included in the telecommunication device, which is external to and distinct from the terminal, the telecommunication network access modem being configured to connect the telecommunication device to and access a telecommunication network and corresponding to the network access driver stored in the memory; and starting up, automatically by said operating system of said terminal, the network access driver, wherein the driver is configured to drive the telecommunication network access modem from the terminal by dispatching commands to the network access modem through a communication link between the terminal and the telecommunication device, which drive the network access modem to connect the telecommunication device to and access the telecommunication network.

2. The configuration method as claimed in claim 1, further comprising:

establishing a communication link between the terminal and the communication network, by the telecommunication network access modem and connection parameters stored in the memory.

3. The configuration method as claimed in claim 1, further comprising:

starting up a driver of a chip card reading device configured to interrogate a chip card, the driver being stored in the memory and configured to drive the reading device through a communication link between the terminal and the reading device.

4. The configuration method as claimed in claim 3, further comprising:

establishing a secure communication tunnel between the terminal and a server of the telecommunication network, during which a strong authentication procedure is implemented by a chip card interrogatable via the driver of the chip card reading device.

5. The configuration method as claimed in claim 3, further comprising:

constructing at least one virtual partition based on enciphered data stored in the memory to render the enciphered data accessible by a user of the terminal.

6. The configuration method as claimed in claim 3, further comprising:

dispatching to a chip card, interrogatable via the driver of the chip card reading device, a request to decipher at least one enciphered deciphering key;

deciphering at least part of the enciphered data stored in means for storing data by at least one deciphered deciphering key.

7. A device for configuring a terminal, the device comprising:

a telecommunication device, which is external to and distinct from said terminal and comprising a telecommunication network access modem for accessing a telecommunication network;

a memory that is distinct from any memory of the terminal and accessible by a basic input/output system of the terminal during a phase of starting up of the terminal, the memory comprising:

an operating system of the terminal, and a network access driver of the telecommunication device, which is configured to drive the telecommunication network access modem on the telecommunication device from the terminal through a communication link between the terminal and the telecommunication device, wherein terminal is configured to trigger automatically, upon starting up of the terminal, at least:

detection by the basic input/output system of the terminal of presence of the memory, access by the basic input/output system to the memory, starting up of the operating system of the terminal stored in the memory, detecting, by the operating system of the terminal, presence of the telecommunication network access modem included in the telecommunication device; and starting up, automatically by said operating system of said terminal, the network access driver to drive the telecommunication network access modem on the telecommunication device from the terminal by dispatching commands to the network access modem through the communication link between the terminal and the telecommunication device, which drive the network access modem to connect the telecommunication device to and access the telecommunication network.

8. The device as claimed in claim 7, further comprising:
a chip card;
a reading device configured to interrogate the chip card;
the memory further comprising:

a driver of the reading device configured to drive the reading device from the terminal through a communication link between the terminal and the reading device, the operating system configured to start up the driver of the reading device.

9. The device as claimed in claim 7, further comprising:

means for storing data comprising: enciphered data, and at least one enciphered deciphering key;

the memory further comprising:

a data access management driver configured to construct at least one virtual partition based on enciphered data stored in the means for storing data, to render the enciphered data accessible by a user of the terminal, the data access management driver configured to dispatch to the chip card via the driver of the reading device a request to decipher at least one enciphered deciphering key and configured to trigger the decipherment of at least part of the enciphered data by at least one deciphered deciphering key, the operating system configured to trigger execution of the deciphering driver.

10. The device as claimed in claim 8, the memory, the telecommunication network access modem, and the chip card being integrated into a mobile telecommunication terminal.

11. The method of claim 1, wherein the driver is configured with connection parameters specific to a user for connection to the telecommunication network through the telecommunication network access modem.

12. The device of claim 7, wherein the driver is configured with connection parameters specific to a user for connection to the telecommunication network through the telecommunication network access modem.

* * * * *